Nov. 28, 1967 M. BRINDLE 3,355,187
LEAF HANDLING DEVICE
Filed Aug. 9, 1966
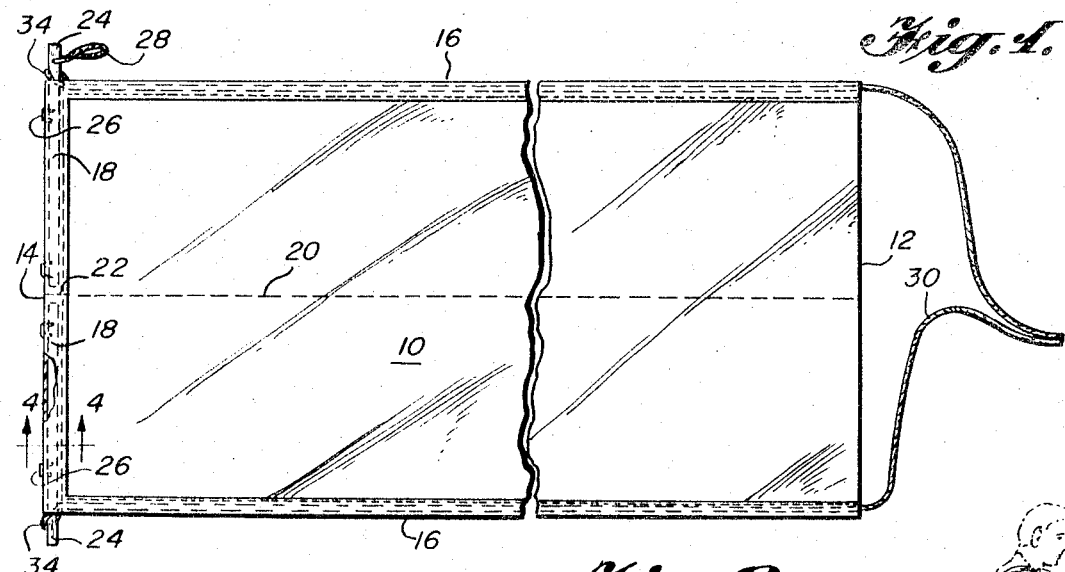
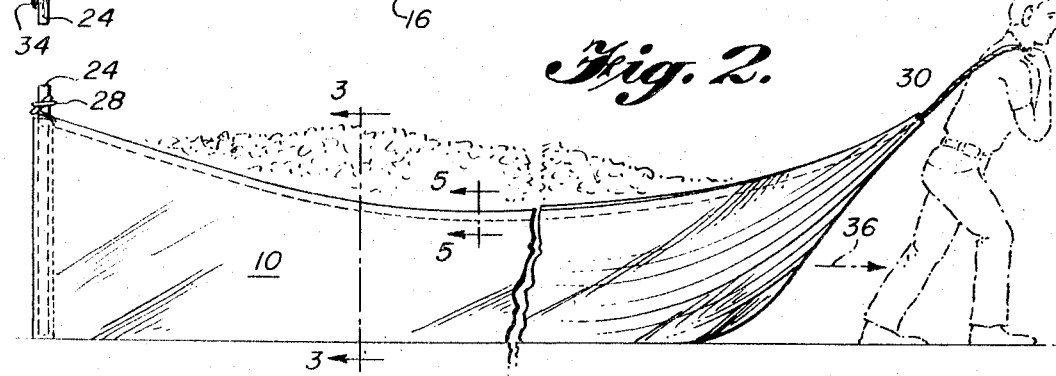
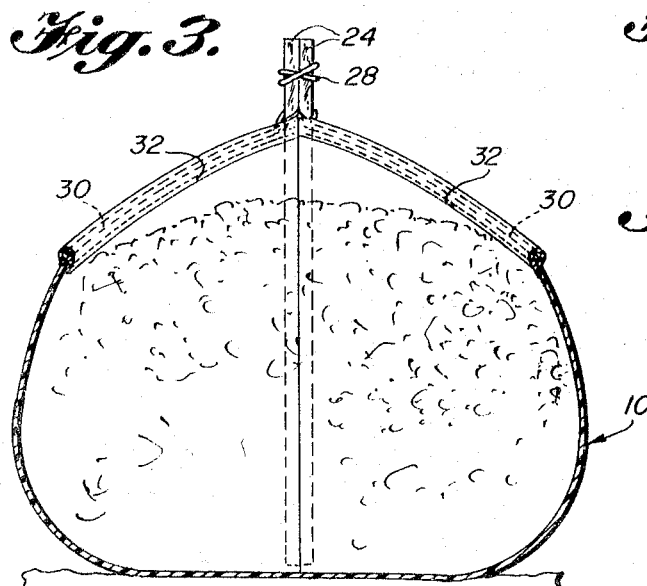
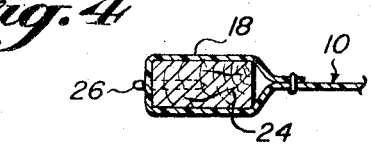
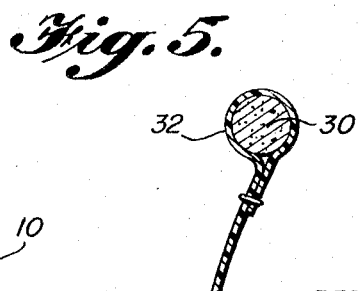
INVENTOR
MELBOURNE BRINDLE
BY
Lane, Aitken, Dunner & Ziems
ATTORNEYS United States Patent Office 3,355,187
Patented Nov. 28, 1967

3,355,187
LEAF HANDLING DEVICE
Melbourne Brindle, Bridgewater, Conn. 06752
Filed Aug. 9, 1966, Ser. No. 571,285
5 Claims. (Cl. 280—19)

This invention relates to a device for handling lawn debris such as leaves, and the like. More particularly, it concerns a unique leaf collecting and transporting device which is readily convertible from a flat sheet to a receptable so that a pile of leaves or the like may be collected thereon and then transported, after the conversion, to a suitable place for disposal.

The problem of collecting leaves and the like during the fall and winter months of each year is one with which most homeowners are quite familiar. Usually, the disposal of leaves involves collecting them at one point of a yard or lawn and then moving them to a location where they may be properly burned or to a compost pile. Although many forms of devices have been used in the past to collect leaves and move them to a suitable place for disposal, such devices have been either so extremely crude or so costly that they are generally not practicable.

In accordance with the present invention, an extremely simple, inexpensive device is provided which greatly facilitates the collection and transportation of leaves and like lawn debris to a suitable place for disposal. Essentially, the device includes a generally rectangular sheet of light flexible material arranged to have a pair of battens or stiffeners extending outwardly from the longitudinal center-line of the sheet and along the rear edge thereof. A pair of ropes or cords, suitably fixed one to each side of the sheet, extend forwardly of the front edge of the sheet. Hence, after leaves or the like are raked onto the sheet in a flat position, the battens are folded one against the other and fixed in such a position to provide the rear end of a boat-like receptacle. Thereafter, the remaining portion of the sheet is gathered about the load of leaves by proper manipulation of the ropes fixed to the side edges. The load of leaves may then be moved by exerting a pull on the ropes to drag the device over the ground to a point where the leaves may be dumped.

Among the objects of this invention, therefore, are: the provision of a unique, low-cost device for handling lawn debris such as leaves; the provision of a leaf handling device of the type referred to which may be folded or rolled into a compact, relatively small package to facilitate both the distribution and sale of the device and the storage of the device after use; and the provision of a leaf handling device of the type referred to which features a construction that lends itself to variations in size, that is, small sizes which may be easily handled by one person to large sizes which might be moved with the use of a tractor.

Other objects and further scope of applicability of the present invention will be apparent from the detailed description to follow taken in conjunction with the accompanying drawings in which:

FIG. 1 is a plan view of the leaf collecting device of this invention in position to have leaves raked or otherwise deposited thereon;

FIG. 2 is a profile of the device in condition to be moved over the ground;

FIG. 3 is an enlarged cross-section taken along line 3—3 of FIG. 2;

FIG. 4 is an enlarged fragmentary cross-section taken on line 4—4 of FIG. 1; and FIG. 5 is an enlarged fragmentary cross-section taken on line 5—5 of FIG. 2.

As shown in the drawings, and particularly in FIGS. 1, 4 and 5 thereof, the lawn debris or leaf collecting and handling device of this invention includes a generally rectangular sheet 10, of any flexible material suitable for the purpose having front, rear and side edges 12, 14 and 16, respectively. Many diverse types of material are contemplated for use in the sheet 10, such as, for example, light canvas, sail or parachute fabric, cheesecloth, burlap, and other relatively light resinous materials such as polyethylene and the like.

A pair of elongated pockets or sleeves 18 are provided along the rear edge 14 of the sheet 10, each of which extends from a point adjacent the longitudinal center-line 20 of the sheet outwardly to the side edges 16. The pockets or sleeves are formed by providing a hem along the rear edge 14, in the embodiment shown, and dividing the hem into the two pockets by stitching or by otherwise effecting a division 22. Each of the pockets serves to receive one of a pair of battens or stiffeners 24. The battens may be formed of any relatively stiff material such as wooden dowel stock, various plastics and the like. To secure the battens within the pockets 18, any suitable means such as staples 26 or nails may be driven through the pocket hem into the batten. Also it will be noted that each of the battens 24 projects slightly beyond the side edges 16 of the sheet and means, such as a rope loop 28, is fixed to at least one of the projecting ends of the battens so that these ends may be secured one against the other as shown in FIGS. 2 and 3 of the drawings.

A pair of hauling or gathering cords in the form of flexible ropes 30 are secured along the side edges 16 of the sheet and project forwardly of the front edge 12 of the sheet to serve as means for grasping and hauling the device in a manner which will be described more fully below. Although the ropes may be secured in any suitable fashion along the side edges 16, preferably, as shown in the drawings, they are threaded through sleeves 32 formed by hems extending along each of the edges 16. It is also preferred that the ropes 30 be provided with loops 34 at their rear ends to engage the outer end portions of the battens 24. In this manner, the ropes 30 provide a direct and complete interconnection of reinforcing means along the side rear edges of the sheet.

In use, the sheet 10 is unfolded and placed on the ground in the manner illustrated in FIG. 1 of the drawings. Then, leaves or other lawn debris are raked into a pile on the sheet. When the pile or load of leaves has reached a suitable size, the outer ends of the battens 24 are grasped and moved one against the other into the position illustrated in FIGS. 2 and 3 of the drawings. The rope loop 28 is then wrapped around the outer of projecting ends of the battens to secure them one against the other and thus to provide a closed rear end of a boat-like receptacle. The ropes or cords 30 extending beyond the front edge 12 of the sheet are grasped and pulled upwardly so that the remainder of the sheet 10 is gathered about the load or pile of leaves thereon. The leaves are now ready for transportation to a place for disposal merely by dragging the device manually and in a direction designated by an arrow 36, all as depicted in FIG. 2 of the drawings. Alternatively, the ropes 30 could be tied to a draw bar of a lawn tractor, or the like, for movement to a place in which the leaves or other debris may be disposed of. To unload the device, the leaves or other debris may be dumped simply by raising the rear end of the receptacle, or if desired, batten connecting means 28 may be released and the leaves dumped by pulling along any one of the front, rear or side edges of the sheet.

It will be appreciated therefore that by this invention an extremely effective device for handling light lawn debris is provided and by which the above-mentioned objectives, among others, are completely fulfilled. Also, it is contemplated that variations in the structure illustrated in the drawings may be effected without departing from the true spirit and scope of the invention. For example, the provision of hems along the rear edge 14 and side edges 16 to serve as means for securing the battens and ropes, respectively, along these edges might be replaced by various other suitable fixing means, such as adhesives, clasps and the like. Also, the hems themselves may be formed in a number of different ways, depending upon the particular material used for the sheet 10. In other words, if a fabric is to be employed, the hems may be formed by stitching in a conventional fashion. If, on the other hand, the sheet 10 is formed from thermoplastic material, such as polyethylene, the hems may be formed by heat-welding techniques. Also, provision may be made for adding further cords or ropes on the order of the ropes 30 extending longitudinally of the sheet 10 though inwardly of the edges 16. In this manner, the sheet not only would be reinforced, but further facility for gathering the sheet about a load of leaves would be provided.

Since, therefore, many variations and modifications of the present invention are possible, it is to be distinctly understood that the foregoing is illustrative of a preferred embodiment only, not limiting, and that the true spirit and scope of this invention is to be determined by reference to the appended claims.

The invention claimed is:
1. A device for collecting and transporting lawn debris such as leaves and the like, said device comprising: a generally rectangular sheet of flexible material having front, rear and side edges; a pair of relatively rigid battens adapted to be secured in tandem along the rear edge of said sheet and each to extend between an inner end positioned near the longitudinal center of said sheet and an outer end adjacent to each of said side edges; means to secure the outer ends of said battens to each other, and flexible means secured along said side edges whereby the sheet may be gathered about a load of debris gathered on the sheet in a flat condition, by pivoting said battens one against the other and securing the outer ends thereof to provide the rear closed end of a boat-like receptacle, and the forward portion of said sheet gathered about the remainder of the load by manipulation of said flexible means.

2. The device recited in claim 1 including a hem along said rear edge to provide a pair of elongated pockets for receiving said battens.

3. The device recited in claim 2 in which said battens are secured against removal from said pockets.

4. The device recited in claim 1 including a hem along each of said side edges in which said flexible means includes ropes received in said hems.

5. The device recited in claim 4 in which said ropes are secured to said battens and extend forwardly thereof significantly beyond the front edge of said sheet to provide means for hauling the device and a load thereon along the ground.

References Cited
UNITED STATES PATENTS

| | | | |
|---|---|---|---|
| 1,435,880 | 11/1922 | C. E. Shipp | 280—19 |
| 2,195,553 | 4/1940 | F. S. Bartlett | 280—18 |
| 2,424,694 | 7/1947 | L. Jones | 280—19 |
| 2,974,971 | 3/1961 | H. H. Buck | 280—19 |
| 3,140,878 | 7/1964 | T. E. Davis | 280—18 |

BENJAMIN HERSH, *Primary Examiner.*

J. SIEGEL, *Assistant Examiner.*